United States Patent
Li et al.

(10) Patent No.: US 11,869,228 B2
(45) Date of Patent: Jan. 9, 2024

(54) SYSTEM AND A METHOD FOR GENERATING AN IMAGE RECOGNITION MODEL AND CLASSIFYING AN INPUT IMAGE

(71) Applicant: VISENZE PTE LTD, Singapore (SG)

(72) Inventors: Guangda Li, Singapore (SG); Thanh Tung Todd Cao, Singapore (SG); Zhenhua Wang, Singapore (SG); Xin Ji, Singapore (SG)

(73) Assignee: VISENZE PTE LTD, Singapore (SG)

( * ) Notice: Subject to any disclaimer, the term of this patent is extended or adjusted under 35 U.S.C. 154(b) by 2 days.

(21) Appl. No.: 17/763,606

(22) PCT Filed: Nov. 6, 2020

(86) PCT No.: PCT/SG2020/050642
§ 371 (c)(1),
(2) Date: Mar. 24, 2022

(87) PCT Pub. No.: WO2022/098295
PCT Pub. Date: May 12, 2022

(65) Prior Publication Data
US 2023/0237769 A1 Jul. 27, 2023

(51) Int. Cl.
*G06V 10/764* (2022.01)
*G06V 10/77* (2022.01)
*G06N 3/082* (2023.01)

(52) U.S. Cl.
CPC .......... *G06V 10/764* (2022.01); *G06N 3/082* (2013.01); *G06V 10/7715* (2022.01)

(58) Field of Classification Search
CPC ... G06V 10/764; G06V 10/7715; G06N 3/082
See application file for complete search history.

(56) References Cited

U.S. PATENT DOCUMENTS

| 5,796,924 A | 8/1998 | Errico et al. |
| 9,996,755 B2 | 6/2018 | Tsai et al. |

(Continued)

FOREIGN PATENT DOCUMENTS

WO 2016075274 5/2016

OTHER PUBLICATIONS

Baker, B., et al., "Designing Neural Network Architectures Using Reinforceent Learning." Published as a conference paper at ICLR (2017), https://arxiv.org/abs/1611.02167, 18 pgs.

(Continued)

*Primary Examiner* — David F Dunphy
(74) *Attorney, Agent, or Firm* — PATENT LAW WORKS LLP

(57) ABSTRACT

A method of generating an image recognition model for recognising an input image and a system thereof are provided. The method includes appending at least one feature extraction layer to the image recognition model, extracting a plurality of feature vectors from a set of predetermined images, grouping the plurality of feature vectors into a plurality of categories, clustering the plurality of feature vectors of each of the plurality of categories into at least one cluster, determining at least one centroid for each of the at least one cluster, such that each of the at least one cluster comprises at least one centroid, such that each of the at least one centroid is represented by a feature vector, generating a classification layer based on the feature vector of the at least one centroid of the plurality of categories, and appending the classification layer to the image recognition model. In addition, a method of classifying an input image and a system thereof are provided.

14 Claims, 6 Drawing Sheets

(56) References Cited

U.S. PATENT DOCUMENTS

| | | | | |
|---|---|---|---|---|
| 11,216,697 | B1* | 1/2022 | Shen | G06V 40/168 |
| 2004/0022442 | A1* | 2/2004 | Kim | G06V 40/164 |
| | | | | 382/190 |
| 2012/0170852 | A1 | 7/2012 | Zhang et al. | |
| 2017/0262737 | A1 | 9/2017 | Rabinovich et al. | |

OTHER PUBLICATIONS

PCT International Search Report and Written Opinion; Application No. PCT/SG2020/050642 Visenze Pte Ltd., International filing date of Nov. 6, 2020, Andrew Munro Australian Patent Office, dated Jan. 21, 2021, 9 pgs.
EPO Communication, Extended European Search Report, Application No. 20950487, Visenze Pte Ltd, Nov. 3, 2022, 9 pgs.
Tammoy, Das, "Machine Learning Algorithms for Image Classification of Hand Digts and Face Recognition Dataset." International Research Journal Engineering and Technology, Dec. 2017, vol. 64,, Issue 12, pp. 640-649.

* cited by examiner

SYSTEM AND A METHOD FOR GENERATING AN IMAGE RECOGNITION MODEL AND CLASSIFYING AN INPUT IMAGE

CROSS-REFERENCE TO RELATED APPLICATIONS

This application is a national phase entry under 35 U.S.C. § 371 of International Patent Application No. PCT/SG2020/050642, filed Nov. 6, 2020, designating the United States of America, the entireties of which is incorporated by reference herein.

TECHNICAL FIELD

The present invention relates to a system and a method for generating an image recognition model for recognising an input image. The present invention further relates to a system and a method for classifying an input image.

BACKGROUND

Due to the remarkable image recognition performance, deep learning methods have been widely researched and applied. A traditional deep learning image recognition model consists of a feature extraction module and a classification module. The recognition process using such a model includes taking an image of a given object and inputting it to the feature extraction module, which consists of a number of neural network layers, to generate a feature vector, basically a list of numbers, for the image. Subsequently, the classification module is used to process the feature vector and identify the object by categorizing it into one of the predefined classes or identities. Generally, a classification module consists of one classification neural network layer, which is typically a fully connected layer of nodes. When recognizing an image, the classification module applies this layer on the feature vector obtained from the feature extraction module, and produces a list of numbers, each corresponds to a predefined category, and the actual value represents the similarity between the image and the category. The larger the value is, the more similar is the image to the category. Finally, the name of the category with maximum value will be retrieved and returned and the image is thus recognized. When using the above deep learning image recognition model, the entire recognition process is calculated end-to-end in a neural network model. The whole model can be trained end-to-end using a deep learning algorithm such as back-propagation, given sufficient training data. Such an approach has a simple structure, and has been greatly optimized for computational efficiency. However, one major disadvantage is that the classification layer in the classification module is fixed after training. Once the model was trained, it is difficult to either add one more category for the model to recognize, or tune the performance of one specific category, without re-training the whole model again, which will often be time-consuming and affect the model's performance on all categories.

A search-based recognition model, on the other hand, is much more flexible than a classification model with regard to the above-mentioned aspects. A search-based recognition model has no classification layer in its classification module. Instead, it consists of a database of a large number of indexed feature vectors of a set of images. These feature vectors are pre-extracted by the feature extraction module. To recognise an input image, after receiving the input feature vector extracted from the feature extraction module, the recognition module will scan its database and retrieve the indexed feature vector nearest (i.e. most similar) to that input feature vector, and return the category name associated with that indexed feature vector. Compared to the conventional image recognition model mentioned in the previous paragraph, such a search-based recognition model is much more flexible with the introduction of the database. By adding, removing or updating the feature vectors in the database in the recognition module, it is possible not only to improve the image recognition performance of an existing category, but also to modify the list of categories recognizable by the model. In other words, it is now possible to fine-tune such a model without re-training the underlying neural network layers.

However, a search-based recognition model also has its disadvantages. The feature database size is often large since it is proportional to the numbers of images added, which is typically the whole training set, instead of the number of categories. As a result, it often consumes more memory resources than a traditional recognition model, and it also requires more computation when performing a recognition task. Therefore, it is more difficult to deploy the model on a system with limited resources, e.g. a mobile device. It is possible to reduce the database size by only indexing a small number of images, even just one image, for each category, but the process of selecting the right images to index in order to preserve the recognition performance is non-trivial.

It is therefore necessary to have a new type of recognition model that is able to overcome the above-mentioned issues. Preferably, it is structurally simple, easy to update and improve, while still able to achieve a good recognition accuracy.

SUMMARY

According to various embodiments, a method of generating an image recognition model for recognising an input image is provided. The method includes appending at least one feature extraction layer to the image recognition model, extracting a plurality of feature vectors from a set of predetermined images, grouping the plurality of feature vectors into a plurality of categories, clustering the plurality of feature vectors of each of the plurality of categories into at least one cluster, determining at least one centroid for each of the at least one cluster, such that each of the at least one cluster includes at least one centroid, such that each of the at least one centroid is represented by a feature vector, generating a classification layer based on the feature vector of the at least one centroid of the plurality of categories, and appending the classification layer to the image recognition model.

According to various embodiments, the method may include varying the number of clusters of each of the plurality of categories into a new number of clusters, re-clustering the plurality of feature vectors of each of the plurality of categories into the new number of clusters, re-determining at least one centroid for each of the new number of clusters wherein each of the at least one centroid is represented by a feature vector, and re-generating the classification layer of the image recognition model based on the feature vector of the at least one centroid of each of the new number of clusters.

According to various embodiments, the method may include receiving a plurality of images for a new category, extracting a plurality of new feature vectors from the plurality of images by the feature extraction module, clustering the plurality of new feature vectors into at least one new cluster, generating at least one centroid for each of the at least one new cluster, wherein each of the at least one centroid is represented by a feature vector, and appending the feature vector of each of the at least one centroid for each of the at least one new cluster to the classification layer of the image recognition model.

According to various embodiments, the method may include receiving a plurality of selected images in one of the plurality of categories, extracting a plurality of new feature vectors of the plurality of selected images, adding the plurality of new feature vectors to the plurality of feature vectors of the one of the plurality of categories to form a new set of feature vectors, re-clustering the new set of feature vectors into at least one cluster, re-generating at least one centroid for each of the at least one cluster, such that each of the at least one centroid is represented by a feature vector, and appending the feature vector of each of the at least one centroid for each of the at least one cluster to the classification layer of the image recognition model.

According to various embodiments, the plurality of feature vectors may be clustered using the k-mean algorithm.

According to various embodiments, a method for classifying an input image is provided. The method includes receiving the input image, inputting the image to the generated image recognition model as mentioned above to classify the input image into one of the plurality of categories, and outputting a category name of the one of the plurality of categories of the input image from the image recognition model.

According to various embodiments, the method may include extracting a feature vector of the input image, comparing the feature vector to the plurality of centroids in the classification layer, determining one of the plurality of centroids that is nearest to the feature vector; identifying the category of the one of the plurality of centroids; and retrieving a category name of the category of the one of the plurality of centroids.

According to various embodiments, comparing the feature vector to the plurality of centroids may include calculating the distances between the feature vector and each of the feature vector of the at least one centroid of the plurality of categories.

According to various embodiments, a system for generating an image recognition model for recognising an input image is provided. The system includes a processor, and a memory in communication to the processor for storing instructions executable by the processor, such that the processor is configured to append at least one feature extraction layer to an image recognition model, extract a plurality of feature vectors from a set of pre-determined images, group the plurality of feature vectors into a plurality of categories, cluster the plurality of feature vectors of each of the plurality of categories into at least one cluster, determine at least one centroid for each of the at least one cluster, such that each of the at least one cluster comprises at least one centroid, wherein each of the at least one centroid is represented by a feature vector, generate the classification layer based on the feature vector of the at least one centroid of the plurality of categories; and append the classification layer to the image recognition model.

According to various embodiments, the processor may be configured to vary the number of clusters of each of the plurality of categories into a new number of clusters, re-cluster the plurality of feature vectors of each of the plurality of categories into the new number of clusters, re-determine at least one centroid for each of the new number of clusters wherein each of the at least one centroid is represented by a feature vector, re-generate the classification layer in the recognition model based on the feature vector of the at least one centroid of each of the new number of clusters.

According to various embodiments, the processor may be configured to receive a plurality of selected images in one of the plurality of categories, extract a plurality of new feature vectors of the plurality of selected images, add the plurality of new feature vectors to the plurality of feature vectors of one of the plurality of categories to form a new set of feature vectors, re-cluster the new set of feature vectors into at least one cluster, re-generate at least one centroid for each of the at least one cluster, such that each of the at least one centroid is represented by a feature vector, and append the feature vector of each of the at least one centroid for each of the at least one cluster to the classification layer to the image recognition model.

According to various embodiments, the plurality of feature vectors may be clustered using k-mean algorithm.

According to various embodiments, a system for classifying an input image is provided. The system includes a processor, and a memory in communication to the processor for storing instructions executable by the processor, such that the processor is configured to receive the input image, input the input image to the generated image recognition model as mentioned above to classify the input image into one of the plurality of categories; and output a category name of the one of the plurality of categories of the input image from the image recognition model.

According to various embodiments, the processor may be configured to extract a feature vector of the input image, compare the feature vector to the plurality of centroids in the classification layer, determine one of the plurality of centroids that is nearest to the feature vector, identify the category of the one of the plurality of centroids and retrieve the category name of the category of the one of the plurality of centroids.

According to various embodiments, a non-transitory computer readable storage medium comprising instructions is provided, such that the instructions, when executed by a processor in a system, cause the system to append at least one feature extraction layer to an image recognition model, extract a plurality of feature vectors from a set of pre-determined images, group the plurality of feature vectors into a plurality of categories, cluster the plurality of feature vectors of each of the plurality of categories into at least one cluster, determine at least one centroid for each of the at least one cluster, such that each of the at least one cluster comprises at least one centroid, such that each of the at least one centroid is represented by a feature vector, generate the classification layer based on the feature vector of the at least one centroid of the plurality of categories, and append the classification layer to the image recognition model.

According to various embodiments, a non-transitory computer readable storage medium comprising instructions is provided, such that the instructions, when executed by a processor in a system, cause the system to receive an input image, input the input image to the generated image recognition model as mentioned above to classify the input image into one of the plurality of categories, and output a category name of the one of the plurality of categories of the input image from the image recognition model.

DETAILED DESCRIPTION

Figure 1:
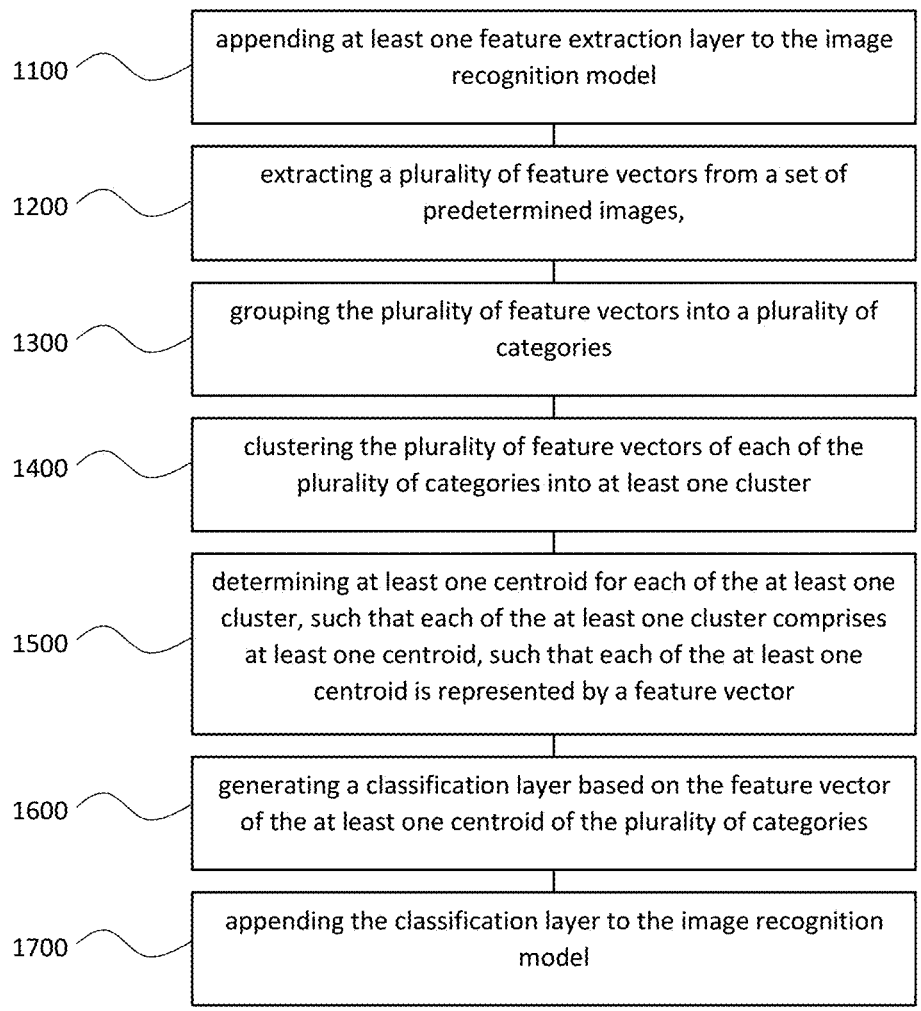
FIG. 1 shows an exemplary flow diagram of a method for generating an image recognition model for recognising an input image.

FIG. 1 shows an exemplary flow diagram of a method 1000 for generating an image recognition model for recognising an input image. Method includes appending at least one feature extraction layer to the image recognition model in block 1100, extracting a plurality of feature vectors from a set of predetermined images in block 1200, grouping the plurality of feature vectors into the plurality of categories in block 1300, clustering the plurality of feature vectors of each of the plurality of categories into at least one cluster in block 1400, determining at least one centroid for each of at least one cluster in block 1500, such that each of the at least one cluster includes at least one centroid, such that each of the at least one centroid is represented by a feature vector, generating a classification layer based on the feature vector of the at least one centroid of the plurality of categories in block 1600, and appending the classification layer to the image recognition model in block 1700. The method may be implemented by a system, e.g. a computer, a server, a mobile device, etc.

The image recognition model may include a feature extraction module and a classification module. The feature extraction module may include the at least one feature extraction layer. The classification module may include a classification layer. From the feature extraction module, a conversion and compression process may be carried out to generate the parameters for generating the classification layer. By having a "one class multiple centroids" in the classification model, as will be shown later, it is possible to obtain a balanced model size and recognition accuracy. There may be a plurality of classes in the classification layer. This image recognition model has the flexibility of a search-based recognition model, while retaining the deployment simplicity and efficiency of a traditional classification model. Consequently, the image recognition model is more suitable to be deployed on a resource constrained system, such as a mobile device.

Figure 2:
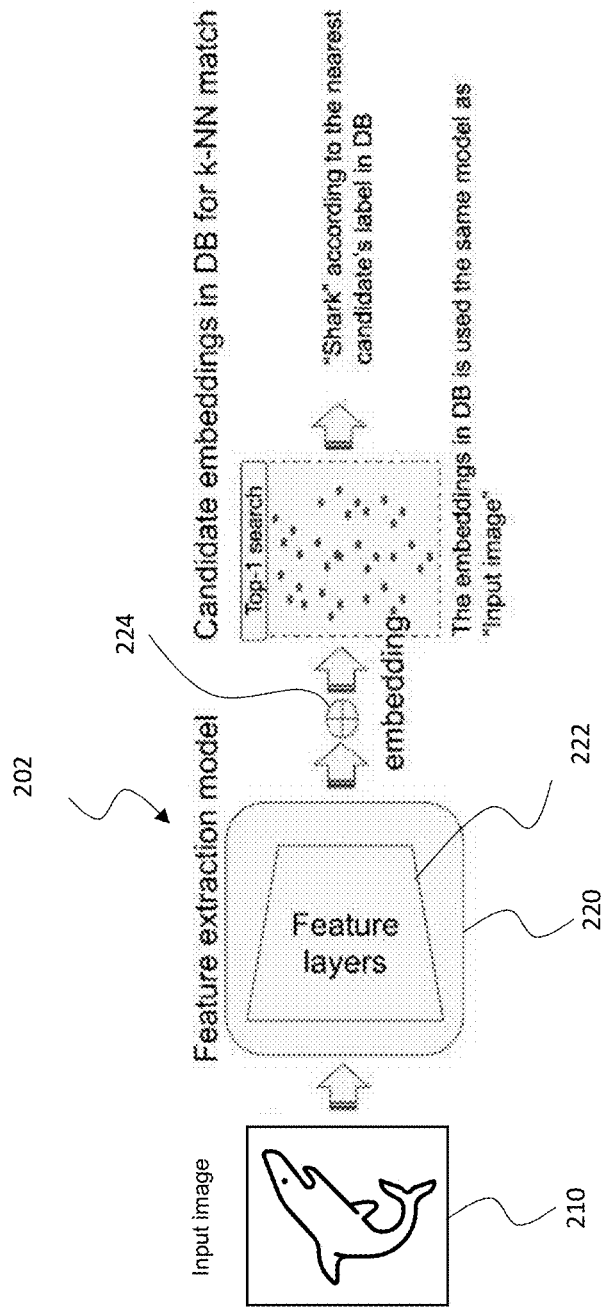
FIG. 2 shows an exemplary flow diagram of the feature extraction model recognising an input image.

FIG. 2 shows an exemplary flow diagram of the image recognition model 230 processing an input image 210. Image recognition model 230 may be a search-based recognition model. Image recognition model 230 may include the feature extraction module 220. Image recognition model 230 may include a recognition module configured to recognise an image. Recognition module may include a feature vector database. Feature vector database may store feature vectors of images and the category name of the feature vectors. As shown in FIG. 2, the feature extraction module 220 may include at least one feature extraction layer 222. The at least one feature extraction layer 222 may include a stack of convolutional neural network layers. The layers may be weighted and weights (parameters) of these layers may be commonly known in the state of the art. The feature extraction module 220 may be pre-trained using a deep learning algorithm. A common training method may be supervised training. For example, a taxonomy of categories for the recognition target may first be defined and a set of predetermined images related to the taxonomy of categories may be used as training data to train the at least one feature extraction layer 222 using a classification objective function. When the objective function converges to below a certain threshold, the training can be stopped and the at least one feature extraction layer 222 may be used to extract feature vectors from the input image.

The feature extraction module 220 may be configured to extract feature vectors from a predetermined set of images, i.e. feature vectors of feature items of the predetermined set of images. This set of images may be the same as the images used to train the feature extraction module 220, or images in a separate search database. To recognise an input image 210, the feature extraction module 220 may convert the input image 210, which may simply be a three-dimensional float tensor, to a one-dimensional float vector, referred to as the embedding 224 of the input image 210. The embedding 224 may be matched against feature vectors in the feature database of the recognition module. When the feature vector, e.g. of a shark, is matched to the input image embedding 224 as the most similar one, the category name associated with the category of the feature vector may be retrieved, e.g. "shark", and returned, and the input image 210 is recognised. Various methods of measuring similarity commonly known in the state of the art may be used, e.g. cosine similarity.

Figure 3:
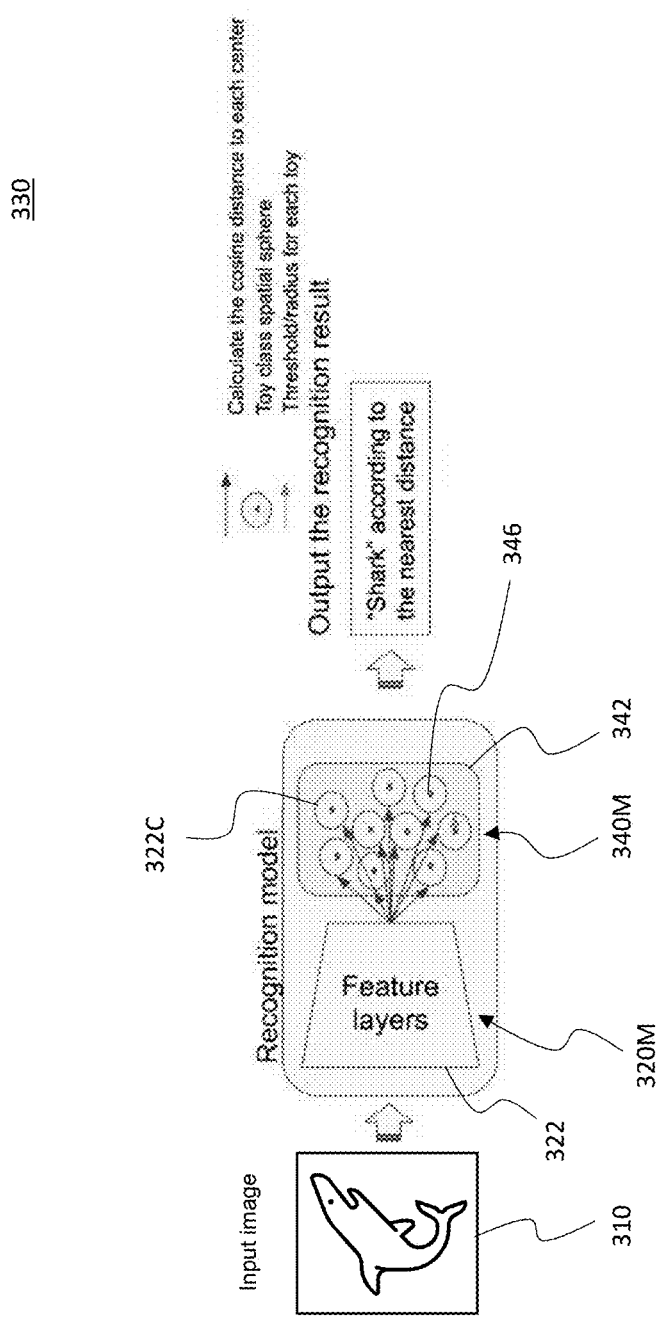
FIG. 3 shows an exemplary flow diagram of the image recognition model classifying an input image.

FIG. 3 shows an exemplary flow diagram of the image recognition model 330 classifying an input image 310. The image recognition model 330 may include a feature extraction module 320M and a classification module 340M. The feature extraction module 320M may include at least one feature extraction layer 322 (as described in FIG. 2). The feature extraction module 320 may be configured to extract a plurality of feature vectors of the feature items in the set of predetermined images.

Referring to FIG. 3, the classification module 340M may include a classification layer 342, which is a fully connected neural network layer. The classification layer 342 may be generated based on the predetermined set of images. For the generation of the classification layer 342, a plurality of categories may be determined for the image recognition model 330. For example, to classify images related to animals, the plurality of categories may include dogs, cats, sharks, etc. A plurality of feature vectors (the embeddings) may be extracted from the predetermined set of images by the feature extraction module 320M based on the feature items in the predetermined set of images. After that, the plurality of feature vectors may be grouped into the plurality of categories based on the categories of the corresponding predetermined set of images to form the feature vectors for each of the plurality of categories. At least one centroid 346 may be determined for each of the plurality of categories. A plurality of centroids 346 may be determined for each of the plurality of categories. One or more or a plurality of centroids 346 for each of the plurality of categories may be determined by clustering the feature vectors of the category into at least one cluster 322C and a centroid 346 for each of the at least one cluster may be generated. Consequently, a plurality of centroids 346 may be generated for the plurality of clusters 322C. The clustering can be performed using a clustering technique such as k-means, k-means++, k-medians, k-medoids, etc. As the number of centroids 346 increases, the accuracy of the recognition model may be improved. The classification layer 342 may be generated based on the centroids 346 of all the plurality of categories. Each centroid 346 may be represented by a feature vector, hence if there are a number of categories, C, and a number of centroids, K, or feature vectors, the classification layer 342, e.g. as a fully connected layer, may be formed by C x K number of centroids 346 or feature vectors and be used to classify an input image 310 into one of the plurality of categories. The classification module 340M may be appended after the feature extraction module 320M to form the image recognition model 330. Specifically, the classification layer 342 may be appended to the image recognition model 330. The image recognition model 330 may be used to recognize the input image 310.

By clustering the plurality of feature vectors to the number of centroids, K, the classification module 340M may be configured to perform similarly to a search-based classification module where the feature database is compressed to reduce the size of the image recognition model 330. At the same time, by increasing the number of centroids, K, the accuracy of the classification module 340M is increased.

It is possible to vary the precision of the classification module 340M by varying the number of centroids, K, of each of the plurality of categories. The number of centroids, K, for each of the plurality of categories may be the same. The number of centroids may be the same for each of the plurality of classes in the classification module 340M. Varying the number of centroids, K, may also be known as adjusting the granularity of the classification layer 342. By adjusting the granularity of the classification layer 342, the accuracy and size of the classification layer 342 may be adjusted. Specifically, when the number of centroids, K, is increased, the accuracy of the classification layer 342 may be improved, while the size of the classification layer 342 is increased. Conversely, when the number of centroids, K, is reduced, the accuracy and size of the classification layer 342 may be decreased. Therefore, depending on the resource of the system where the image recognition model 330 is deployed, the granularity of the image recognition model 330 may be adjusted accordingly to achieve optimal results. For example, to vary the precision of the classification module, the number of clusters 322C of each of the plurality of categories may be varied into a new number of clusters 322C. When the number of clusters 322C are varied, the plurality of feature vectors of each of the plurality of categories may be re-clustered into the new number of clusters 322C. For example, the number of clusters 322C may be increased or decreased. Based on the new number of clusters 322C, at least one centroid for each of the new number of clusters 322C may be re-determined. As such, the number of centroids K may be varied. Noteworthily, after the number of centroids, K, is varied or adjusted, the plurality of feature vectors of each of the plurality of categories may be re-clustered into new clusters 322C accordingly. Based on the new number of clusters 322C, new clustered centroids may be determined, and the classification layer 342 in the image recognition model 330 may be re-generated based on the new clustered centroids. All of these may be easily done without re-training the classification layers as well as the feature extraction layers.

Similarly, in the event that the image recognition model 330 needs to be updated, such as when a new category needs to be recognised, the classification layer 342 may be modified directly without re-training the whole image recognition model 330. To update the classification layer 342 to recognize the new category, a selected plurality of images that belong to the new category may be provided. A plurality of new feature vectors of the plurality of images may be extracted using the feature extraction module 320M. Next, the plurality of new feature vectors of the new category may be clustered into at least one new cluster 322C. For example, the plurality of new feature vectors may be clustered into a plurality of new clusters 322C. At least one centroid may be generated for each of the at least one new cluster 322C. Each of the at least one centroid may be represented by a feature vector and the corresponding feature vector of the at least one centroid or corresponding feature vectors of a plurality of the centroids may be appended to the classification layer 342, i.e. the classification layer 342 may be re-generated based on the plurality of feature vectors of the plurality of centroids of the plurality of categories, including the plurality of new feature vectors of the new category. Thereafter, the image recognition model 330 may be used to recognize images of the new category.

It may also be possible to update or improve the accuracy of one of the plurality of categories of the classification layer 342 by providing a new set of plurality of selected images of the one of the plurality of categories to the image recognition model 330. Plurality of selected images in one of the plurality of categories may be received by the system. Feature extraction module 320M may be configured to extract a plurality of new feature vectors of feature items from the plurality of selected images. The plurality of new feature vectors may be added to the existing set of feature vectors of the one of the plurality of categories to form a new set of feature vectors. Thereafter, the new set of feature vectors may be re-clustered into at least one cluster 322C. At least one centroid K may be re-generated for each of the at least one cluster 322C. Each of the at least one centroid K may be represented by a feature vector. The feature vector of each of the at least one centroid for each of the at least one cluster 322C may be appended to the classification layer 342 of the image recognition model 330, i.e. the classification layer 342 may be re-generated based on the feature vector of the at least one cluster 322C and the plurality of feature vectors of the other plurality of categories. Thereafter, the one of the plurality of categories with the feature vectors of the new set of selected images may be updated or improved to recognise an input image in the one of the plurality of categories.

In summary, a new category may easily be added into the image recognition model 330, or an existing category can be fine-tuned by updating the corresponding centroids, all without ever re-training the at least one feature extraction layer 320. In this way, the image recognition model 330 is more flexible, controllable and easy to manage.

Figure 4:
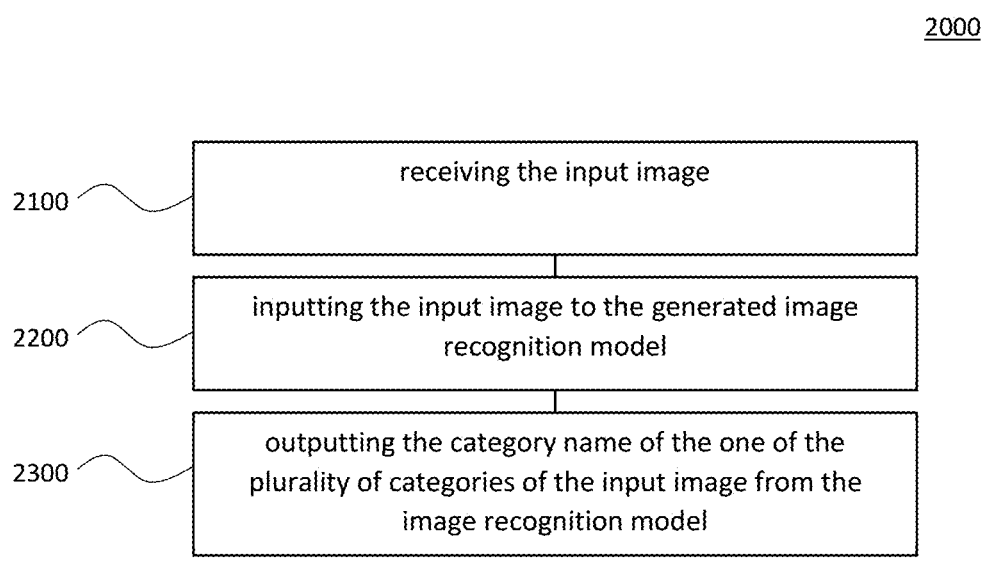
FIG. 4 shows a flow diagram of a method for classifying an image.

FIG. 4 shows a flow diagram of a method 2000 for classifying an image, the method 2000 includes receiving an input image in block 2100, inputting the input image to the generated image recognition model in block 2200 to classify the input image into one of the plurality of categories, and outputting a category name of the one of the plurality of categories of the input image from the image recognition model in block 2300.

Figure 5:
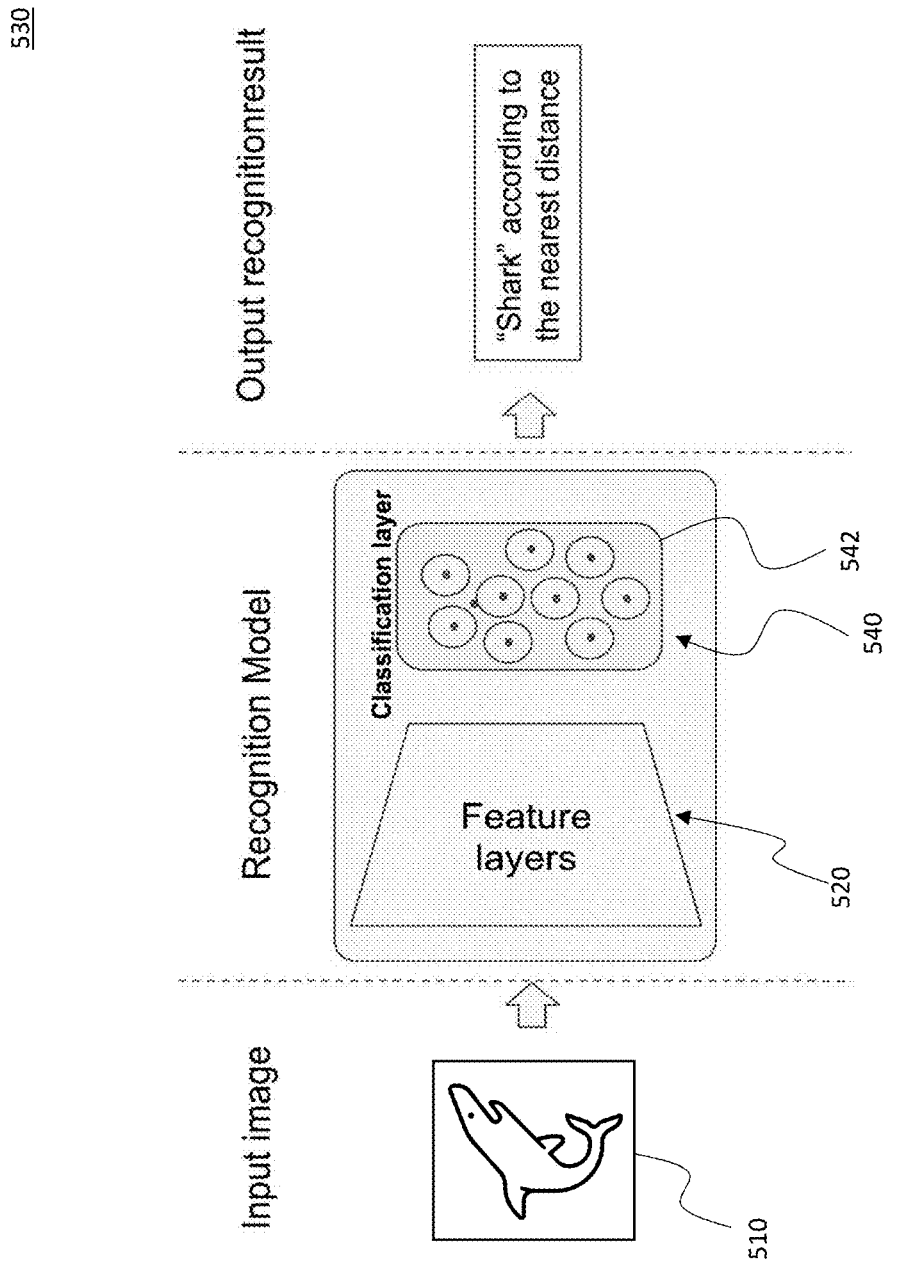
FIG. 5 shows an exemplary flow diagram of the image recognition model identifying an input image.

FIG. 5 shows an exemplary flow diagram of the image recognition model 530 identifying an input image 510. As shown in FIG. 5, the input image 510 may be input to the image recognition model 530. The image recognition model 530 may, after recognising the input image 510, output the category name of the input image 510. When the input image 510 is input to the image recognition model 530, the feature extraction module 520 may extract the feature vector of the input image 510. Thereafter, the feature vector may be input to the classification module 540 where the classification layer 542 is configured to classify it into one of the plurality of categories C. To do so, the feature vector may be compared to the plurality of centroids in the classification layer 542. Classification layer 542 may be configured to determine one centroid that is nearest to the feature vector by calculating the similarity between the feature vector of the input image 510 and the plurality of centroids and return the centroid that is the most similar to the feature vector, e.g. by cosine distance. Accordingly, the category name of the returned centroid may be identified, and the name of the category, e.g. "shark", may be output by the image recognition model 530.

The image recognition model 530 may be suitable for a system that has limited resources, e.g. a mobile device like a mobile phone. In addition, the image recognition model 530 is able to overcome the problems of complex deployment of a search-based recognition module as its structure is simpler and the parameters directly stored within the model itself. Also, the granularity of the classification layer 542 is more flexible, controllable and easily adjusted. Hence, the accuracy of the image recognition model 530 may be optimised for the resource available in the system. In fact, different models with different granularity (and hence accuracy) can easily be computed and deployed to different systems, if needed.

Figure 6:
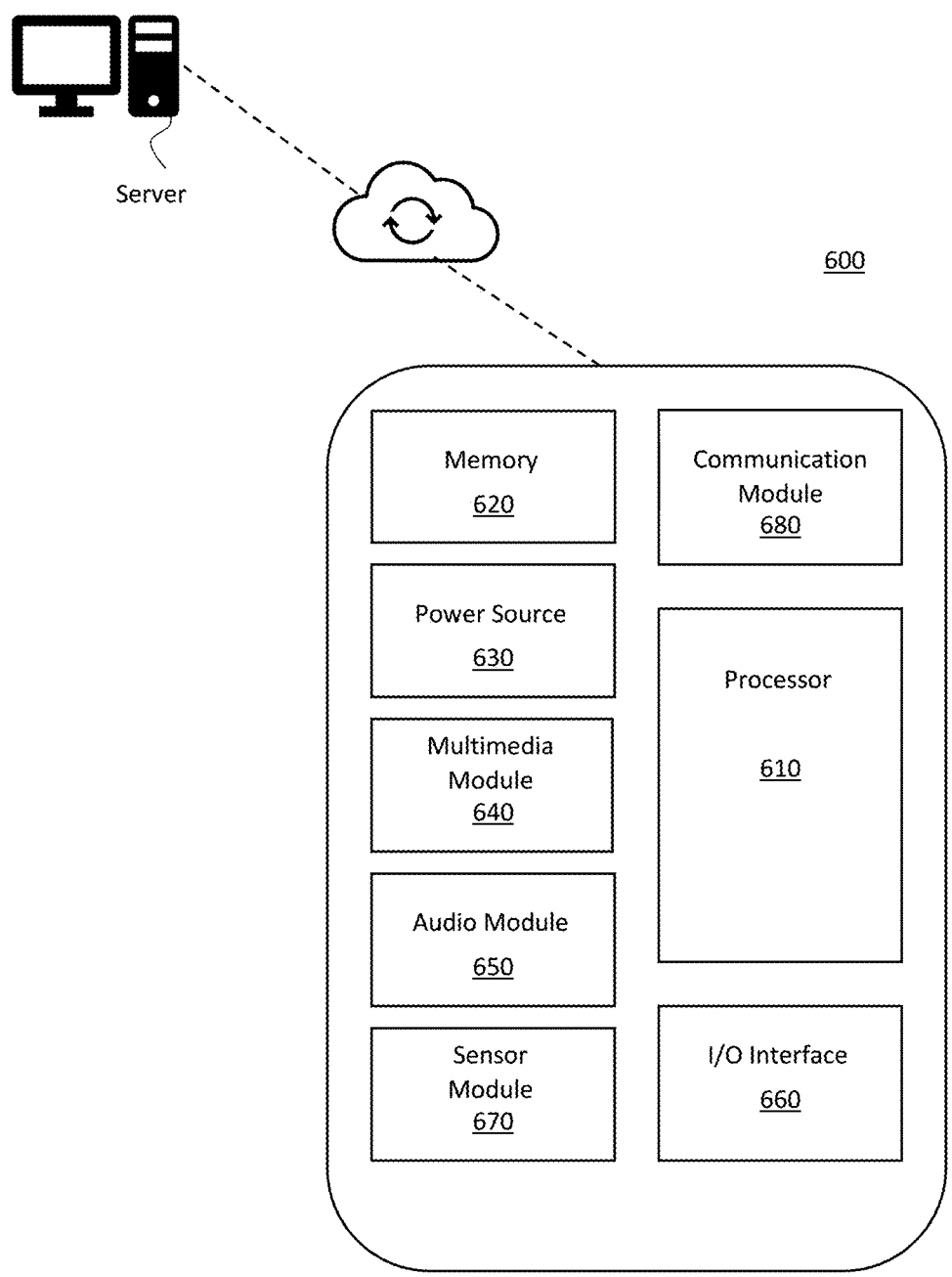
FIG. 6 shows a schematic view of an exemplary embodiment of a system for deploying the methods in FIG. 1.

FIG. 6 shows a schematic view of an exemplary embodiment of the system for deploying the methods in FIG. 1. The abovementioned methods may be deployed in a system. System may include a mobile device, e.g. a mobile phone, tablet, laptop; a computer, etc. System includes a processor 610 and a memory 620 in communication to the processor 610 for storing instructions executable by the processor 610. System may further include at least one of a power source 630, a multimedia module 640, an audio module 650, an input/output (I/O) interface 660, a sensor module 670 and a communication module 680.

The processor 610 typically controls overall operations of the system 600, such as the operations associated with display, telephone calls, data communications, camera operations, and recording operations. The processor 610 may include one or more processors 1340 to execute instructions to perform all or part of the steps in the above described methods. Moreover, the processor 610 may include one or more modules which facilitate the interaction between the processor 610 and other modules. For instance, the processor 610 may include a multimedia module to facilitate the interaction between the multimedia module 640 and the processor 610. System may be in communication with a server 602 via a network.

Memory 620 may be configured to store various types of data to support the operation of the system 600. For example, the data may include instructions for any applications or above methods operated on the system 600, contact data, phonebook data, messages, pictures, video, etc. Memory 620 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

Power source 630 provides power to various modules of the system 600. Power source 630 may include a power management system, one or more power sources, and any other modules associated with the generation, management, and distribution of power in the system 600.

Multimedia module 640 may include a screen providing an output interface between the system 600 and the user. In some embodiments, the screen may include a liquid crystal display (LCD), organic light-emitting diode (OLED), a touch panel, etc. If the screen includes the touch panel, the screen may be implemented as a touch screen to receive input signals from the user. Touch panel may include one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia module 640 may include a front camera and/or a rear camera for capturing the input image. The front camera and/or the rear camera may receive an external multimedia datum while the system 600 is in an operation mode, such as a photographing mode or a video mode. Each of the front camera and the rear camera may be a fixed optical lens system or have focus and optical zoom capability.

Audio module 650 may be configured to output and/or input audio signals. For example, the audio module 650 may include a microphone ("MIC") configured to receive an external audio signal when the system 600 is in an operation mode, such as a call mode, a recording mode, and a voice recognition mode. The received audio signal may be further stored in the memory 620 or transmitted via the communication module 680. In some embodiments, the audio module 650 further includes a speaker to output audio signals.

I/O interface 660 provides an interface between the processor 610 and peripheral interface modules, such as a keyboard, a click wheel, buttons, and the like. The buttons may include, but are not limited to, a home button, a volume button, a starting button, and a locking button.

Sensor module 670 includes one or more sensors to provide status assessments of various aspects of the system 600. For instance, the sensor module 670 may detect an open/closed status of the system 600, relative positioning of modules, e.g., the display and the keypad, of the system 600, a change in position of the system 600 or a module of the system 600, a presence or absence of user contact with the system 600, an orientation or an acceleration/deceleration of the system 600, and a change in temperature of the system 600, etc. Sensor module 670 may include a proximity sensor configured to detect the presence of nearby objects without any physical contact. Sensor module 670 may also include a light sensor, such as a CMOS or CCD image sensor, for use in imaging applications. In some embodiments, the sensor module 670 may also include an accelerometer sensor, a gyroscope sensor, a magnetic sensor, a pressure sensor, or a temperature sensor.

Communication module 680 may be configured to facilitate communication, wired or wirelessly, between the system 600 and other devices or the server 602. System 600 may access a wireless network based on a communication standard, such as WiFi, 2G, or 3G, LTE, and 4G cellular technologies or a combination thereof. In one exemplary embodiment, the communication module 680 may receive a broadcast signal or broadcast associated information from an external broadcast management system via a broadcast channel. In one exemplary embodiment, the communication module 680 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the system 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic modules, for performing the above described methods.

A non-transitory computer readable storage medium comprising instructions, wherein the instructions, when executed by a processor in a system, cause the system to append at least one feature extraction layer to an image recognition model, extract a plurality of feature vectors from a set of pre-determined images, group the plurality of feature vectors into a plurality of categories, cluster the plurality of feature vectors of each of the plurality of categories into at least one cluster, determine at least one centroid for each of the at least one cluster, such that each of the at least one cluster comprises at least one centroid, such that each of the at least one centroid is represented by a feature vector, generate the classification layer based on the feature vector of the at least one centroid of the plurality of categories, and append the classification layer to the image recognition model.

A non-transitory computer readable storage medium comprising instructions, wherein the instructions, when executed by a processor in a system, cause the system to receive an input image, input the input image to the generated image recognition model as mentioned above to classify the input image into one of the plurality of categories, and output a category name of the one of the plurality of categories of the input image from the image recognition model.

A skilled person would appreciate that the features described in one example may not be restricted to that example and may be combined with any one of the other examples.

The present invention relates to a system and a method for generating an image recognition model and classifying an input image generally as herein described, with reference to and/or illustrated in the accompanying drawings.

The invention claimed is:

1. A method of generating an image recognition model for recognizing an input image, comprising:
    appending at least one feature extraction layer to the image recognition model;
    extracting a plurality of feature vectors from a set of predetermined images;
    grouping the plurality of feature vectors into a plurality of categories;
    clustering the plurality of feature vectors of each of the plurality of categories into at least one cluster;
    determining at least one centroid for each of the at least one cluster, wherein each of the at least one cluster comprises at least one centroid, wherein each of the at least one centroid is represented by a feature vector;
    generating a classification layer based on the feature vector of each of the at least one centroid of the plurality of categories;
    appending the classification layer to the image recognition model; and
    receiving a plurality of selected images in one of the plurality of categories, extracting a plurality of new feature vectors of the plurality of selected images, adding the plurality of new feature vectors to the plurality of feature vectors of the one of the plurality of categories to form a new set of feature vectors, re-clustering the new set of feature vectors into at least one cluster, re-generating at least one centroid for each of the at least one cluster, wherein each of the at least one centroid is represented by a feature vector, and appending the feature vector of each of the at least one centroid for each of the at least one cluster to the classification layer of the image recognition model.

2. The method according to claim 1, comprising varying a number of clusters of each of the plurality of categories into a new number of clusters, re-clustering the plurality of feature vectors of each of the plurality of categories into the new number of clusters, re-determining at least one centroid for each of the new number of clusters wherein each of the at least one centroid is represented by a feature vector, and re-generating the classification layer of the image recognition model based on the feature vector of the at least one centroid of each of the new number of clusters.

3. The method according to claim 1, further comprising receiving a plurality of images for a new category, extracting a plurality of new feature vectors from the plurality of images by a feature extraction module, clustering the plurality of new feature vectors into at least one new cluster, generating at least one centroid for each of the at least one new cluster, wherein each of the at least one centroid is represented by a feature vector, and appending the feature vector of each of the at least one centroid for each of the at least one new cluster to the classification layer of the image recognition model.

4. The method according to claim 1, wherein the plurality of feature vectors are clustered using k-means algorithm.

5. The method according to claim 1, further comprising:
    receiving an input image;
    inputting the image to the generated image recognition model to classify the input image into one of the plurality of categories; and
    outputting a category name of the one of the plurality of categories of the input image from the image recognition model.

6. The method according to claim 5, wherein the method comprises:
    extracting a feature vector of the input image;
    comparing the feature vector to the plurality of centroids in the classification layer;
    determining one of the plurality of centroids that is nearest to the feature vector;
    identifying the category of the one of the plurality of centroids; and
    retrieving a category name of the category of the one of the plurality of centroids.

7. The method according to claim 6, wherein comparing the feature vector to the plurality of centroids comprises calculating the distances between the feature vector and each of the feature vector of the at least one centroid of the plurality of categories.

8. A system for generating an image recognition model for recognizing an input image, the system comprising:
    a processor; and
    a memory in communication to the processor for storing instructions executable by the processor,
    wherein the processor is configured to:
        append at least one feature extraction layer to an image recognition model;
        extract a plurality of feature vectors from a set of pre-determined images;
        group the plurality of feature vectors into a plurality of categories;
        cluster the plurality of feature vectors of each of the plurality of categories into at least one cluster;
        determine at least one centroid for each of the at least one cluster, wherein each of the at least one cluster comprises at least one centroid, wherein each of the at least one centroid is represented by a feature vector;

generate a classification layer based on the feature vector of each of the at least one centroid of the plurality of categories;

append the classification layer to the image recognition model; and receive a plurality of selected images in one of the plurality of categories, extract a plurality of new feature vectors of the plurality of selected images, add the plurality of new feature vectors to the plurality of feature vectors of one of the plurality of categories to form a new set of feature vectors, re-cluster the new set of feature vectors into at least one cluster, re-generate at least one centroid for each of the at least one cluster, wherein each of the at least one centroid is represented by a feature vector, and append the feature vector of each of the at least one centroid for each of the at least one cluster to the classification layer to the image recognition model.

9. The system according to claim 8, wherein the processor is configured to vary a number of clusters of each of the plurality of categories into a new number of clusters, re-cluster the plurality of feature vectors of each of the plurality of categories into the new number of clusters, re-determine at least one centroid for each of the new number of clusters wherein each of the at least one centroid is represented by a feature vector, re-generate the classification layer in the image recognition model based on the feature vector of the at least one centroid of each of the new number of clusters.

10. The system according to claim 8, wherein the plurality of feature vectors are clustered using k-means algorithm.

11. The system according to claim 8, wherein the processor is configured to:

receive an input image;

input the input image to the generated image recognition model to classify the input image into one of the plurality of categories; and output a category name of the one of the plurality of categories of the input image from the image recognition model.

12. The system according to claim 11, wherein the processor is configured to extract a feature vector of the input image, compare the feature vector to the plurality of centroids in the classification layer, determine one of the plurality of centroids that is nearest to the feature vector, identify the category of the one of the plurality of centroids and retrieve the category name of the category of the one of the plurality of centroids.

13. A non-transitory computer readable storage medium comprising instructions, wherein the instructions, when executed by a processor in a system, cause the system to:

append at least one feature extraction layer to an image recognition model;

extract a plurality of feature vectors from a set of pre-determined images;

group the plurality of feature vectors into a plurality of categories;

cluster the plurality of feature vectors of each of the plurality of categories into at least one cluster;

determine at least one centroid for each of the at least one cluster, wherein each of the at least one cluster comprises at least one centroid, wherein each of the at least one centroid is represented by a feature vector;

generate a classification layer based on the feature vector of each of the at least one centroid of the plurality of categories;

append the classification layer to the image recognition model; and receive a plurality of selected images in one of the plurality of categories, extract a plurality of new feature vectors of the plurality of selected images, add the plurality of new feature vectors to the plurality of feature vectors of one of the plurality of categories to form a new set of feature vectors, re-cluster the new set of feature vectors into at least one cluster, re-generate at least one centroid for each of the at least one cluster, wherein each of the at least one centroid is represented by a feature vector, and append the feature vector of each of the at least one centroid for each of the at least one cluster to the classification layer to the image recognition model.

14. The non-transitory computer readable storage medium of claim 13, wherein the instructions, when executed by the processor cause the system to:

receive an input image;

input the input image to the image recognition model to classify the input image into one of the plurality of categories; and output a category name of the one of the plurality of categories of the input image from the image recognition model.

* * * * *